United States Patent

Gilson

Patent Number: 5,492,992
Date of Patent: Feb. 20, 1996

[54] PROCESS FOR POLYMERIZATION

[75] Inventor: Jean M. Gilson, Sombreffe, Belgium

[73] Assignee: Dow Corning S.A., Seneffe, Belgium

[21] Appl. No.: 349,658

[22] Filed: Dec. 5, 1994

[30] Foreign Application Priority Data

Dec. 10, 1993 [GB] United Kingdom ............ 9325342

[51] Int. Cl.$^6$ .................................... C08G 77/06
[52] U.S. Cl. .................... 528/14; 528/23; 528/21; 528/19; 528/33; 528/34; 556/453; 556/450; 556/459; 556/463
[58] Field of Search .................... 528/23, 21, 14, 528/19, 33, 34; 556/453, 450, 459, 463

[56] References Cited

U.S. PATENT DOCUMENTS 5,319,120  6/1994  Gilson et al. .................. 556/453

FOREIGN PATENT DOCUMENTS

| 522776 | 5/1993 | European Pat. Off. . |
| 3106711 | 7/1986 | Germany . |
| 56-062803 | 5/1981 | Japan . |
| 56-062804 | 5/1981 | Japan . |

OTHER PUBLICATIONS

Abstract U.S. 4,435,261, Mar. 1984.

Primary Examiner—John C. Bleutge
Assistant Examiner—Margaret W. Glass
Attorney, Agent, or Firm—William F. Boley

[57] ABSTRACT

A process for making liquid polymers by condensing monomers and/or oligomers, mixing them with a catalyst where required, and dispersing the mixture via an atomizing device to form small droplets suspended in a reaction chamber. The reagents are caused to polymerize in the dispersed state. The process is preferably carried out in a spray dryer using an atomizing device and is particularly useful for polymerizing organosilicon compounds by condensation.

17 Claims, 1 Drawing Sheet

PROCESS FOR POLYMERIZATION

This invention is concerned with a process for polymerisation, more particularly a process using a reactor in which liquid polymers are formed within small droplets after atomising monomers and/or oligomers. It is more particularly related to the process of polymerisation which occurs through condensation reactions, especially for siloxane polymers.

Polymerisation reactors have been known for a long time. They generally take the form of a kettle in which the mixing of the ingredients is easily performed. Where continuous polymerisation units are required, tubular systems using appropriate mixing means e.g. baffles or kneaders, may also be used. In existing systems residence time of the reagents may be quite extended, especially where efficient distribution of a catalyst and heat transfer are essential. In many systems there is also a danger that the polymer will build up on the walls of the reactor, thus reducing the efficiency of the unit. There is a continuing need to provide a polymerisation process which will allow the formation of polymers in an improved manner.

We have now found that where the reagents for the polymerisation reaction are fed into certain reactors with an atomising device, and caused to form small droplets in suspension, improved polymerisation efficiency results if the polymerisation is taking place inside the small droplets. The present invention is restricted to those polymerisation systems where condensation reactions occur and a by-product is formed with higher volatility than that of the reaction product.

Atomising devices are known and have been used for a number of applications. They are particularly known for coating equipment (e.g. spray guns) and for spray drying equipment, in which a liquid composition e.g. a dispersion or a slurry, is dried to form a powder material. Equipment of this latter type has been used e.g. in the manufacture of powder detergent compositions.

Atomising devices have also been disclosed in relation to polymerisation but not where liquid polymer production is envisaged. For example U.S. Pat. No. 4,435,261 discloses a process for free radical polymerisation of liquid monomers into thermoplastic polymers, comprising the introduction of at least one monomer into a chamber of a cell of an electrostatic atomising device having a discharge spray means and injecting an electric charge through said liquid monomer in the chamber, the electric charge being sufficient to generate free excess charge in the liquid monomer to initiate polymerisation of the monomer into a polymer in the chamber. Monomers stated as useful in this application are styrene, t-butyl-styrene, chlorostyrene, acrylonitrile and vinyl toluene. In all the examples the monomers are dispersed in a hydrocarbon oil. German patent specification DE 31 06 711 discloses the production of solid particles, particularly grains or beads, by polymerising a liquid for example methacrylate, by atomising the liquid into droplets in a gas and allowing these droplets to solidify whilst suspended or precipitating in the gas. The gas may be heated or irradiated to promote the speed of polymerisation. The WPI abstract of Japanese application 56062804 discloses the manufacture of flame retardant powdered crosslinked powder by atomising polymerisable liquid compositions in gas exposed to UV radiation. The liquid composition is specified as a mixture of a liquid or semi-solid pre-polymer having two or more polymerisable unsaturations in a molecule, a vinyl polymer and a photosensitiser. The pre-polymer is exemplified by epoxy acrylate and polyester polyol acrylate.

All these prior art references relate to the manufacture of solid particles. Indeed the first reference intends to make polystyrene resins with a glass transition temperature of at least 90° C., while the second and third references specify solid particles or powders. Also, the cited references relate to a process of manufacturing polymers whereby the polymerisation is a free radical system, resulting in an addition reaction. In other words, no by-products are formed during the polymerisation reaction. There is no indication whether the use of an atomising device would be applicable to the production of liquid polymers, especially polymers of relatively high viscosity, or whether a different polymerisation system e.g. a condensation reaction could be successfully carried out in such atomising device. Indeed the presence of a by-product is a general concern in condensation reaction systems.

There is a need to provide an improved polymerisation process for those systems which use condensation reaction for the production of liquid polymers, especially in view of the production of by-products during the reaction.

The term 'liquid', where herein used in relation to polymers, monomers or oligomers, denotes the type of materials which have a consistency which will allow them to flow at a temperature of 25° C. and adapt to the shape of the receptacle in which they are placed, when submitted to a force, e.g. gravity. For the sake of clarity it is hereby stated that the term liquid materials excludes those materials which are clearly solid, or clearly gaseous at 25° C. and atmospheric pressure and those materials which are thermoplastic at or above 25° C. For example, the term 'liquid polymers' includes apart from low viscosity polymers, e.g. those having a viscosity of 20 $mm^2/s$ at 25° C., also those polymers which have a high viscosity, e.g. gum-like materials and some very loosely crosslinked materials, e.g. certain gels, which will flow under pressure.

EP-A-522 776 discloses a process for making liquid polymers by condensing monomers and/or oligomers in a polymerisation reactor, comprising the mixing of the monomers and/or oligomers with the appropriate amount of catalyst required, the mixing of the resultant mixture with a pressurised gas to cause it to reach a foam like consistency, feeding the foaming mixture through an inlet means into a reaction chamber having a porous wall and causing the monomers and/or oligomers to polymerise. In a preferred embodiment the inlet means comprises an atomising. device. In the process of this specification the atomising device in conjunction with the use of additional pressurised gas and the use of a narrow reaction chamber, encourages the formation of the foam. The foam like consistency creates a large air-liquid interface, encouraging the use of the process for condensation polymerisation reactions.

The reactor which is used in the process of the prior art, however, needs to be specially built for the process. There is a need to provide a process which can use standard equipment while providing an efficient polymerisation process.

According to the invention there is provided a process for making liquid polymers by condensing monomers and/or oligomers, characterised in that the monomers and/or oligomers are mixed with the appropriate amount of catalyst where required, are dispersed via an atomising device to form small droplets in a reaction chamber and are caused to polymerise in the dispersed state.

The invention is limited to those polymers which are made by the condensation reaction of monomers and/or oligomers. With condensation is meant the chemical reaction in which two or more molecules combine, with the separation of water or some other simple substance, as defined in ASTM D883-54T. A typical example of a condensation reaction is an ester formation by reacting a carboxylic acid with an alcohol, or the formation of an ether by the reaction of two alcohols, both reactions liberating water. One particular condensation polymerisation reaction which is suitable for the process of the present invention is the formation of polysiloxane materials by condensation of organosilicon compounds having silanol groups.

In the method of the invention monomers and/or oligomers are fed to the atomising device. The feeding means may be a gravity feeder located physically above the atomising device. Alternatively the reagents may be fed under pressure via a pumping system, e.g. from a container placed at some distance from the atomising device. Yet another method is the feeding under suction, e.g. via a pump or siphon system. The feeding means may cause the reagents to pass through a heating mechanism which will allow the reagents to be brought to a higher temperature, e.g. the reaction temperature. Where a catalyst is required the feeding means may also include a mixing device for mixing the reagents and the catalyst at the required proportions. Alternatively, the reaction mixture may be prepared beforehand in the correct proportions of monomer and/or oligomer and of the catalyst. This would be useful, for example, where the reaction mixture is not reactive till heated up, e.g. due to the presence of a heat sensitive inhibitor. Where mixing in a catalyst causes the polymerisation reaction to be initiated, this mixing must be done immediately prior to entering the atomising device.

Upon reaching the atomising device the mixture may be atomised by conventional means. This includes the pressurising of the reaction mixture through the device, causing it to form a spray of small particles or droplets. An alternative, and more commonly used, method is the use of a pressurised gas, e.g. compressed air or nitrogen, to atomise the reaction mixture when it passes through the device. This is often referred to as the 2-fluid nozzle system. Also commonly used is the so-called rotary atomiser, which causes the reaction mixture to form small droplets by feeding it onto a fast rotating plate. A flow of pressurised gas may be used in conjunction with any of these systems to direct the spray of droplets as desired. Where it is desired to carry out the polymerisation reaction at increased temperatures it may be possible, instead of heating the reagents, as described above, or in addition thereto, to heat the pressurised gas. This will heat up the small atomised droplets quickly.

Polymerisation occurs while the reagents are in suspension, within the small droplets, which contain a mixture of reagents and catalyst. Many factors will affect the degree of polymerisation, e.g. temperature and catalyst concentration. It is also possible to build the reactor to determine the time during which the droplets are kept in suspension. This can be done by merely adapting the dimensions of the reaction chamber to the required suspension time. Alternatively, the suspension time could be increased by passing a counterflow of gas into the reaction chamber. Suspension time can vary according to the reaction requirements from less than 1 second to several minutes, preferably between 5 and 100 seconds.

Upon atomising the mixture, a very large interfacial surface area is produced. It has been found that this is particularly advantageous for the promotion of condensation reactions, especially where the temperature of the reaction chamber is sufficiently high to encourage the evaporation of the simple by-product, e.g. water or alcohol. This will drive the reaction equilibrium towards the condensation reaction.

It is preferred that an extraction system is provided to remove the by-product of the condensation reaction. Such extraction system may also reduce the pressure which has been created during the atomisation, thus limiting the loss of material through the outlet of the reaction chamber and increasing the residence time of the small droplets in the reaction chamber. This extraction system has an inlet inside the reaction chamber, which may be located at the top of the reaction chamber, thus causing a pressure reduction at the upper part of the chamber. It is, however, preferred to locate the inlet nearer the lower end of the reaction chamber, e.g. half-way down the chamber, most preferably reasonably centrally, in order to avoid interfering with the compressed gas stream when used, and in order to avoid sucking up too many small droplets of unpolymerised or partially polymerised material. The atomising device and reaction chamber are preferably arranged in such a way that the atomised reaction mixture will be allowed to fall freely under the force of gravity, to be collected at the lower end of the reaction chamber. This means that the atomising device will preferably discharge the reaction mixture downwards, although a sideways discharge is also possible.

A suitable reactor chamber into which the atomising device will discharge the reaction mixture may be a standard chamber, as known in the art of spray drying or atomising. Accordingly the process is preferably carried out in a conventional spray drying apparatus. Particularly suitable chambers have a cylindrical upper part connected to the widest section of an inverted conical lower part. The conical part is preferably truncated and open at the narrow end, i.e. its lowest end, to allow the finished product to be collected. The inclined surface of the lower conical part encourages the collection of the droplets on the walls. For this reason the size of the reaction chamber is usually chosen thus that the small droplets spend sufficient time in suspension in the chamber to allow polymerisation to occur to a desired degree. It is possible that the polymerisation is continued to some extent when the droplets have collected on the inclined walls of the reaction chamber. Such further reaction is, however, going to be less efficient than when the droplets are still in suspension as the liquid-gas interface is smaller. Continued polymerisation may, however, be encouraged on the walls by e.g. heating the walls. Indeed, as an alternative or in addition to heating the reagents prior to polymerisation, either directly prior to atomising or indirectly when formed into small droplets, as described above, the whole reaction chamber may itself be heated up, e.g. by surrounding it with a heating mantle. The liquid polymerised material thus collected then flows downward towards a collection point, e.g. the open truncated lower end of the cone.

At the collection point of the reactor, most suitably the open lower end of the reaction chamber, the polymerised liquid material may be collected immediately in a suitable receptacle, e.g. drum. Where there is a need to inactivate the catalyst an inactivation point may be included in or downstream from the collection point. Such inactivation point may be e.g. a heating point, which is useful where the catalyst is thermo-degradable. Alternatively, there may be provided a neutralisation point for the catalyst, e.g. by linking the collection point to a duct into which a neutralisation agent is added and mixed at the appropriate ratio. The addition of the neutralisation agent may be achieved e.g. through injection. A cooling system may also be installed at or near the collection point, in order to bring the polymer to the desired temperature. A filtration system may be employed, e.g. to filter out any salts formed 10 by neutralisation of the catalyst. Usually a filtration system will be installed before a cooling device, as it is easier to filter a hot liquid which has a lower viscosity.

The process of the invention is particularly preferred for the manufacture of liquid organosiloxane materials by polymerisation of organosilicon compounds having silicon-bonded -OR radicals, in which R represents a hydrogen atom or a lower alkyl group having up to 6 carbon atoms provided at least some of the R groups are hydrogen atoms. It is preferred that at least one R group per molecule represents a hydrogen atom and most preferred that each R group represents a hydrogen atom.

Organosilicon compounds forming the monomers or oligomers in the process of the invention may be organosilanes, organosiloxanes, silcarbanes or mixtures of two or more of these. The silicon-bonded organic substituents in the organosilicon compound may be monovalent hydrocarbon groups having from 1 to 14 carbon atoms, for example alkyl, aryl, aralkyl, alkaryl or alkenyl groups or monovalent substituted hydrocarbon groups having from 1 to 10 carbon atoms, for example amino-substituted alkyl or aryl groups, mercaptoalkyl groups, haloalkyl groups, esterified carboxyalkyl groups, polyoxyalkylene groups and hydroxyalkyl groups. Specific examples of suitable organic substituents which may be present in the organosilicon compounds employed in the process of the invention are methyl, ethyl, propyl, hexyl, dodecyl, tetradecyl, phenyl, xylyl, tolyl, phenylethyl, vinyl, allyl, hexenyl, —R'NH$_2$, —R'NHCH$_2$CH$_2$NH$_2$, —R'SH, —R'Br, —R'Cl and R'OH, wherein R' represents a divalent organic group, preferably having less than 8 carbon atoms, for example —(CH$_2$)$_3$— or —CH$_2$CHCH$_3$CH$_2$—, arylene, e.g. —C$_6$H$_4$— or aralkylene, e.g. —(C$_6$H$_3$.CH$_3$)—. For the majority of commercial applications at least 50% of the organic substituents will be methyl groups, any remaining groups being selected from vinyl and phenyl groups. More preferably at least 80% of all organic substituents are methyl groups, most preferably, substantially all organic substituents.

Although organosilicon compounds for use in the process of the invention may have a number of silicon-bonded groups —OR per molecule, it is preferred that no more than two —OR groups are present on each molecule. This will encourage the formation of substantially linear polysiloxane materials. The preferred organosilicon compounds comprise short chain linear polydiorganosiloxane materials having silanol end-groups. These materials have the average general formula

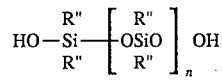

wherein each R" denotes an organic group as hereinabove described and n is an integer, preferably having a value of one to 100. As a general principle, however, an organosilicon compound which is a siloxane polymer is to be regarded as an oligomer for the purpose of this invention, as long as it has a shorter siloxane chain length than the final product obtained by the process of the invention. In the preferred polydiorganosiloxanes each R" denotes a methyl group and n has a value of from 10 to 300, more preferably 50 to 150, most preferably from 75 to 100. These polydiorganosiloxanes are produced by hydrolysis and condensation of dihalodiorganosilanes, and are commercially available materials.

In the process of the invention, silanol end-blocked polydiorganosiloxanes of high viscosity may be produced. If desired, however, condensation products may be end-blocked with triorganosiloxy units, for example, in order to control the molecular weight of the siloxanes. The end-blocking process aims to replace the silanol end-groups with triorganosiloxy groups to prevent further condensation reaction. One method of effecting such end-blocking comprises incorporating a triorganoalkoxy silane or a triorganosilanol in the reaction mixture. A more preferred method of producing triorganosiloxy end-blocked reaction polydiorganosiloxanes comprises the incorporation of polydiorganosiloxane materials, which are end-blocked with a triorganosiloxane group at one end and a hydroxyldiorganosiloxane group at the other end. An alternative way is the use of lower molecular weight polydiorganosiloxanes having only triorganosiloxane end-groups. The use of the latter requires usually the use of a catalyst which has some activity in the breaking of the siloxane Si-O-Si bond. Yet another alternative is the use of a silazane, e.g. hexamethyldisilazane. Suitable triorganosiloxane end-blocking units include a wide variety of materials, such as trialkylsiloxanes, dialkylalkenylsiloxanes and dialkylarylsiloxanes, e.g. trimethylsiloxane, triethylsiloxane, dimethylvinylsiloxane and dimethylphenylsiloxane.

The preferred process of the invention is suitable for use in the preparation of a variety of organosilicon products by a condensation reaction. If desired there may be included with the organosilicon compound other organosilicon compounds for example alkoxysilanes which are reactive with the silanol-containing reactant or condensation products to provide organofunctional or chain terminating groups. Examples of such silanes are trimethyl methoxysilane, methyl phenyl dimethoxysilane, methyl phenyl vinyl ethoxysilane and aminopropyl trimethoxy silane.

The preferred process of the invention involves contacting the organosilicon compounds, which are monomers or oligomers, with a catalyst at a temperature at which the desired rate of polymerisation occurs. It is preferred for the production of polysiloxane materials that the temperature employed is in the range of from about 30° C. to about 300° C. Reactions at lower temperatures are normally too slow to be of commercial interest. More preferably the polymerisation reaction is carried out at a temperature of from 50° to 200° C., most preferably 70° to 180° C. It is also preferred that the by-product formed during the condensation reaction is removed. This will cause the acceleration of the reaction, and is suitably achieved by the use of an extraction system.

Sufficient catalyst is employed to achieve the desired rate of condensation having regard to the nature and geometry of the processing equipment, the temperature of the process and other factors, e.g. the residence time of the reaction mixture in the reaction chamber. In most cases it is preferred to employ from 0.001 to 5% by weight of the catalyst based on the weight of the organosilicon compounds in the reaction mixture.

Preferred catalysts are well known condensation catalysts which have been described in a number of publications. Some catalysts will promote condensation reactions but also act as equilibration catalysts. These are exemplified by sulphuric acid, hydrochloric acid, Lewis acids, sodium hydroxide, tetramethylammonium hydroxide, tetrabutyl phosphonium silanolate and amines. Such catalysts, though not preferred, are useful provided the presence of low molecular weight species in the final product is not to be avoided, or provided the catalyst is inactivated prior to the rearrangement of polymers. More preferred are condensation specific catalysts. These include dodecylbenzene sulphonic acid, n-hexylamine, tetramethylguanidine, carboxylates of rubidium or caesium, hydroxides of magnesium, calcium or strontium and other catalysts as are mentioned in the art, e.g. in G.B. patent specifications 895 091, 918 823 and EP specification 382 365. Also preferred are catalysts based on phosphonitrile chloride, for example those prepared according to U.S. Pat. Nos. 3,839,388 and 4,564,693 or EP application 215 470 and phosphonitrile halide catalysts having the general formula $[X(PX_2=N)PX_3]^+[MX_{(v-t+nR'_t)}]^-$, wherein X denotes a halogen atom, M is an element having an electronegativity of from 1.0 to 2.0 according to Pauling's scale, R' is an alkyl group having up to 12 carbon atoms, n has a value of from 1 to 6, X is the valence or oxidation state of M and t has a value of from 0 to v−1.

Termination of the polymerisation reaction, if desired, may be achieved by conventional and well known methods. For example the temperature of the reaction mixture may be lowered beyond the point where the catalyst is active. Alternatively, the reaction mixture may be heated to a point where the catalyst is inactivated, e.g. by decomposition, provided the polymer is not affected by such action. Yet another alternative termination procedure is the introduction of a inactivation agent. This will depend on the type of catalyst used, and may be a neutralisation agent where the catalyst is acidic or alkaline. Suitable neutralisation agents include amines, epoxy compounds and mild acid materials. Where the catalyst is a solid material or is supported on a solid structure, removal of the catalyst, e.g. by filtration may be used to terminate the reaction.

The condensation products of the process of the invention are useful in a number of applications, as is well known in the art of organosilicon compounds. The invention provides in another of its aspects, liquid polymers which are prepared by the process of the invention, in particular, liquid organosiloxane materials thus prepared. Examples of suitable applications include treatment of textiles to render them water repellant, paper coating to impart high release surfaces, manufacture of sealant and adhesive products and production of elastomer-forming compositions.

BRIEF DESCRIPTION OF THE DRAWING

There now follows a description of a specific embodiment of a reactor for use in a process according to the invention, which is to be read in conjunction with the only figure, which is a schematic view of the reactor. Also given are examples illustrating the process according to the invention in which all parts and percentages are expressed by weight.

The exemplified reactor (10) is a Niro® spray dryer, type P-6.3, which consists of an inlet means (11,15), a reactor chamber (18) and an outlet means (19). The inlet means comprises a reagent inlet means (11) and a compressed air inlet means (15). The compressed air is supplied from a compressor (not shown) through a heat exchanger (also not shown) and is fed into the reaction chamber through inlet (15). The reagents (oligomers/monomers) are supplied from containers (not shown) which are linked via a pump (also not shown) to the reagent inlet means (11). The reagent inlet means also comprises a mixing device (13) for admixing a catalyst supplied via line (12) at required proportions. The reagents are fed via an atomising device (16), which is a rotary atomiser turning at 12,000 rpm. The reactor chamber (18) is conventional with a sloping lower conical design (17). It is connected to an extraction system (20) to eliminate some of the air from the reaction chamber (18) through an exhaust duct (21) and an exhaust fan (23) in order to generate a zero excess pressure at the outlet means (19). Volatiles present in the eliminated air are condensed in a cyclone (22) and collected in a drum (24). The outlet means (19) comprises an inlet for a neutralisation agent (31) which is linked to an injection system with pump (not shown), a cooling system (34) provided with a heat exchanger (not shown), a filtration system (32) and a drum-off point (33).

Figure 1:
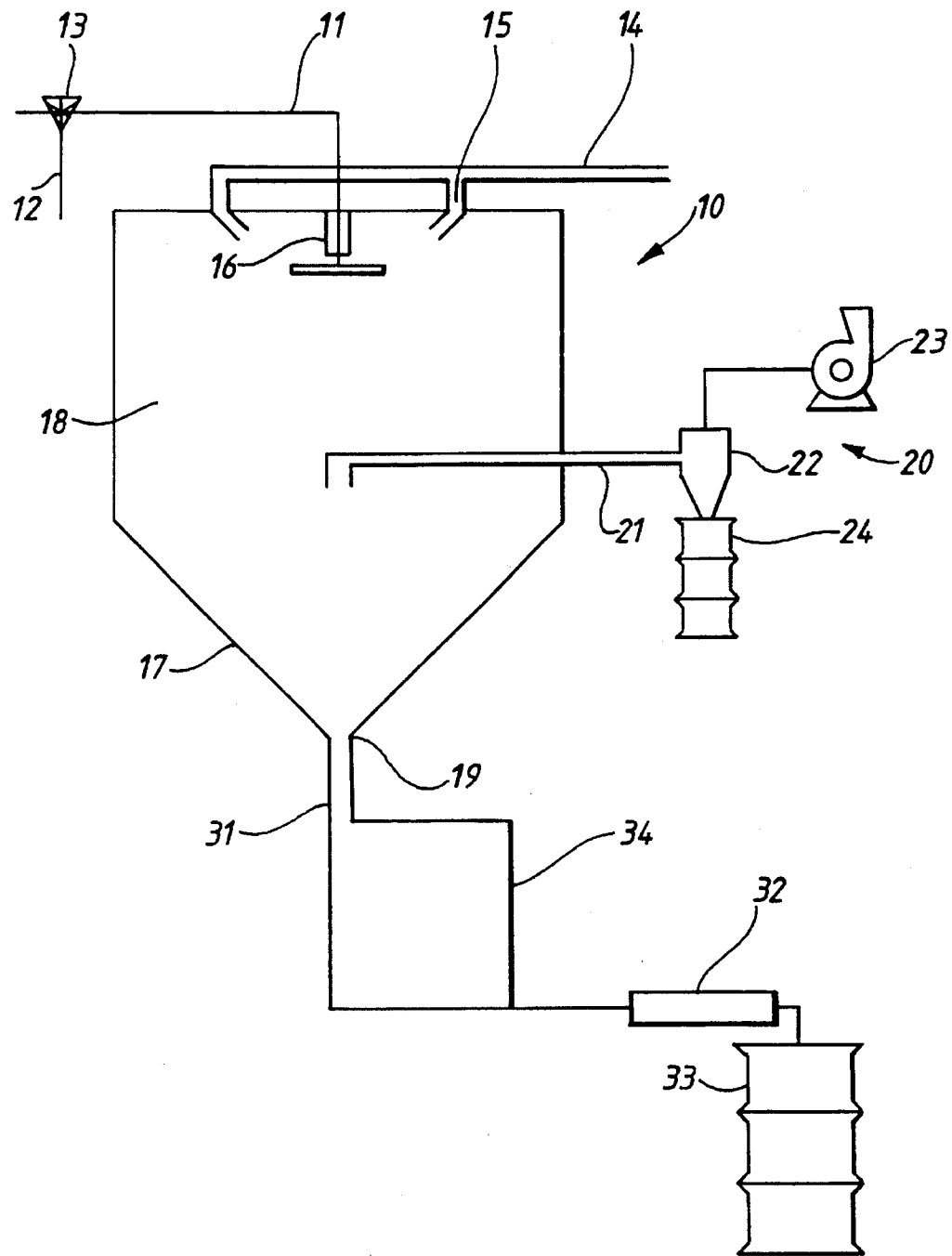

In use, the catalyst and monomers/oligomers are mixed and fed through the atomiser into the reactor. A heated compressed air supply increases the temperature of the atomised mixture to the desired temperature and causes it to polymerise. The atomised product has a high interfacial surface area which accelerates the elimination of the by-product of condensation. The liquid polymerised material is collected along the conical part of the reactor and flows down under the force of gravity. At the outlet means of the reactor, the reaction product is mixed with sufficient neutralisation agent to cause inactivation of the catalyst. The product is then allowed to cool, filtered and collected in drums.

EXAMPLE 1

Production of vinyl end-blocked polydimethylsiloxane

A production run of vinyl end-blocked polydimethylsiloxane was made using the reactor described above. The process being a continuous polymerisation, used a premix composition of 90.9% of hydroxyl end-blocked polydimethylsiloxane polymer having a viscosity of 70 mm$^2$/s and 9.1% of vinyl end-blocked polydimethylsiloxane having a viscosity of 20 mm$^2$/s. Temperature of the premix composition was measured as T3. The premix composition was fed through the reagent inlet means (11) at a rate of 126 kg per hour. Compressed air was fed through inlet (15) at a temperature T1 and a flow rate of 300 m$^3$/hour and was extracted at the same rate through system (20). An antimony derivative of a phosphonitrile chloride was employed as catalyst, at 38 ppm of the premix composition. The temperature in reactor chamber (18) was measured as T2. As neutralisation agent, trihexylamine was introduced through inlet (31) to inactivate the catalyst and terminate the polymerisation reaction. Samples 1 to 3 of the reaction product were collected at different times during the production run through the outlet means (19) at a temperature T4. Temperatures T1 to T4, the actual viscosity at 25° C. (Visc) and the molecular weight, as measured by Gel Permeation Chromatography (GPC) (GPC MW) of the reaction product are recorded in Table I. Also given is the weight of vinyl groups in ppm of the total product. The theoretical viscosity (Th. Visc.) and theoretical molecular weight (Th. MW) are also given, and were calculated on the basis of the ratio of ingredients.

TABLE I

| Samples | 1 | 2 | 3 |
| --- | --- | --- | --- |
| T1 | 226 | 230 | 221 |
| T2 | 112 | 121 | 116 |
| T3 | 127 | 127 | 116 |
| T4 | 92 | 99 | 85 |
| Visc (mm$^2$/s) | 2811 | 2225 | 1966 |
| Th. Visc. | 1937 | 1937 | 1937 |
| ppm Vi | 4599 | 4926 | 5285 |
| Th. MW | 33909 | 33909 | 33909 |
| GPC MW | 31170 | 28539 | 27501 |

It is clear from Table I that the polymerisation of the product according to the process of the invention has occurred giving a product with a viscosity which is very close to the theoretical viscosity.

EXAMPLE 2

Production of methyl end-blocked polydimethylsiloxane

The process was carried out using the same conditions as were used in Example I. The premix composition consisted of 95.54% hydroxyl end-blocked polydimethylsiloxane having a viscosity of 70 mm$^2$/s and 4.46% polydimethylsiloxane having a viscosity of 10 mm$^2$/s. The same catalyst and neutralisation agents were used as in Example 1 at respectively 38 ppm and 69.3 ppm of the premix. Samples 1 to 5 of the reaction product were collected at different times during the production run through the outlet means (19) at temperature T4. The temperatures T1 to T4, the actual viscosity at 25° C. in mm$^2$/s (Visc) and the actual molecular weight as measured by GPC (GPC MW) of the reaction product are recorded in Table II. Also given is the weight of hydroxyl groups in ppm of the total product (ppm OH). Theoretical molecular weight (Th MW) was calculated on the basis of the ratio of ingredients.

TABLE II

| Samples | 1 | 2 | 3 | 4 | 5 |
|---|---|---|---|---|---|
| T1 | 308 | 304 | 299 | 309 | 307 |
| T2 | 150 | 143 | 150 | 155 | 144 |
| T3 | 121 | 121 | 121 | 121 | 122 |
| T4 | 127 | 119 | 123 | 123 | 116 |
| Visc | 5095 | 4498 | 4561 | 4765 | 4340 |
| ppm OH | 193 | 147 | 127 | 163 | 145 |
| Th MW | 26906 | 26906 | 26906 | 26906 | 26906 |
| GPC MW | 35631 | 33553 | 33689 | 34252 | 32727 |

It is clear from the Table that polymerisation of the product according to the process of the invention has occurred reaching a molecular weight very close to the theoretical molecular weight.

EXAMPLE 3

Production of high viscosity vinyl end-blocked polydimethylsiloxane

The process was carried out using the same conditions as Example 1. The premix composition consisted of 95.7% hydroxyl end-blocked polydimethylsiloxane polymer having a viscosity of 70 mm$^2$/s and 4.3% vinyl end-blocked polydimethylsiloxane having a viscosity of 20 mm$^2$/s. The same catalyst and neutralising agents were used as in Example 1 at respectively 38 ppm and 52 ppm. Samples 1 to 5 of the reaction product were collected at different times during the process through the outlet means (19) at temperature T4. Temperatures T1 to T4, the viscosity at 25° C. in mm$^2$/s (Visc) and the actual molecular weight as measured by GPC (GPC MW) of the reaction product are recorded in Table III. Also given is weight of hydroxyl groups and vinyl groups in ppm of the weight of the product (ppm OH and ppm Vi). Theoretical molecular weight (Th MW) and theoretical viscosity (Th Visc) were calculated on the basis of the ratio of ingredients.

TABLE III

| Samples | 1 | 2 | 3 | 4 | 5 |
|---|---|---|---|---|---|
| T1 | 230 | 233 | 229 | 226 | 231 |
| T2 | 116 | 121 | 126 | 122 | 123 |
| T3 | 126 | 126 | 126 | 126 | 126 |
| T4 | 99 | 106 | 110 | 108 | 110 |
| Visc | 24640 | 23906 | 25339 | 28703 | 22019 |
| Th Visc | 28787 | 28787 | 28787 | 28787 | 28787 |
| ppm OH | 226 | 131 | 75 | 138 | 79 |
| ppm Vi | 2670 | 3317 | 3421 | 3086 | 3401 |
| Th MW | 71761 | 71761 | 71761 | 71761 | 71761 |
| GPC MW | 68726 | 68151 | 69262 | 71702 | 66612 |

It is clear from the Table that polymerisation of the product according to the process of the invention has occurred reaching a molecular weight and a viscosity very close to the theoretical values.

That which is claimed is:

1. A process for making liquid polymers by condensing reagents selected from the group consisting of organosilicon compound monomers and oligomers and mixtures thereof which comprises mixing the reagents with an appropriate amount of catalyst, dispersing the reagents via an atomising device forming an atomized mixture of small droplets suspended in a reaction chamber and polymerising the in a dispersed, atomized state.

2. A process according to claim 1 wherein the reagents are discharged via the atomising device into a spray drying apparatus, having a collection point for liquid polymers.

3. A process according to claim 2 wherein inactivation of the catalyst is provided downstream from the collection point.

4. A process according to claim 2 wherein an extraction system, having its inlet located inside the reaction chamber, is provided to aid the removal of a by-product of the condensation reaction.

5. A process according to claim 2 wherein the reagents are heated by one or more methods selected from the group consisting of preheating the reagents prior to entry into the reaction chamber, heating the reagents by means of heated compressed air inside the reaction chamber and heating the reaction chamber by means of a heating mantle.

6. A process according to claim 2 wherein the reagents and the catalyst are premixed prior to dispersing the reagents via the atomising device.

7. A process according to claim 1 wherein an extraction system, having its inlet located inside the reaction chamber, is provided to aid the removal of a by-product of the condensation reaction.

8. A process according to claim 1 wherein the reagents are heated by one or more methods selected from the group consisting of preheating the reagents prior to entry into the reaction chamber, heating the reagents by means of heated compressed air inside the reaction chamber and heating the reaction chamber by means of a heating mantle.

9. A process according to claim 1 wherein the reagents and the catalyst are premixed prior to dispersing the reagents via the atomising device.

10. A process according to claim 1 wherein the liquid polymers are liquid organosiloxane materials made by polymerisation of organosilicon compounds having silicon-bonded -OR radicals, in which R is selected from the group consisting of hydrogen and alkyl groups having up to 6 carbon atoms, provided at least some of the R groups are hydrogen.

11. A process according to claim 10 wherein the reagents are discharged via the atomising device into a spray drying apparatus, having a collection point for liquid polymers.

12. A process according to claim 10 wherein an extraction system, having its inlet located inside the reaction chamber, is provided to aid the removal of a by-product of the condensation reaction.

13. A process according to claim 10 wherein the reagents are heated by one or more methods selected from the group consisting of preheating the reagents prior to entry into the reaction chamber, heating the reagents by means of heated compressed air inside the reaction chamber and heating the reaction chamber by means of a heating mantle.

14. A process according to claim 10 wherein the organosilicon compounds comprise short chain linear polydiorganosiloxanes having the average general formula

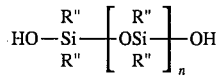

wherein each R" denotes an organic group and n is an integer having a value of one to 100.

15. A process according to claim 14 wherein the liquid polymers made by polymerisation of the organosilicon compounds are end-blocked with triorganosiloxy units by additionally including end-blockers with the organosilicon compounds.

16. A process according to claim 10 wherein the temperature within the reaction chamber is in the range of from 30° C. to 300° C.

17. A process according to claim 10 wherein the catalyst is employed in an amount from 0.001 to 5% by weight based on the weight of the organosilicon compounds and wherein the catalyst is selected from the group consisting of dodecylbenzene sulphonic acid, n-hexylamine, tetramethylguanidine, carboxylates of rubidium, carboxylates of caesium, hydroxides of magnesium, hydroxides of calcium, hydroxides of strontium, phosphonitrile chloride, and phosphonitrile halide catalysts having the general formula $[X(PX_2=N)PX_3]^+[MX_{(v-t+1)}{}^{R'}{}_t]^-$, wherein X denotes a halogen atom, M is an element having an electronegativity of from 1.0 to 2.0 according to Pauling's scale, R' is an alkyl group having up to 12 carbon atoms, n has a value of from 1 to 6, v is the valence or oxidation state of M and t has a value of from 0 to v−1.

* * * * *